July 5, 1960  S. HUBER  2,943,492
METHOD OF BALANCING OSCILLATING OR ROTATING MEMBERS
Filed Feb. 14, 1956

INVENTOR.
Siegfried Huber
BY
Patent Agent.

United States Patent Office 2,943,492
Patented July 5, 1960

2,943,492
METHOD OF BALANCING OSCILLATING OR ROTATING MEMBERS

Siegfried Huber, Nurnberg, Germany, assignor to Diehl Gesellschaft mit beschrankter Haftung, Nurnberg, Germany Filed Feb. 14, 1956, Ser. No. 565,493

Claims priority, application Germany Feb. 19, 1955

1 Claim. (Cl. 73—480)

The present invention relates to a method of balancing small oscillating or rotating bodies such as gears, balancing wheels and the like, according to which the natural unbalance is balanced by adding and/or removing material from the body to be balanced.

While the improved method according to the present invention may be used for balancing various parts such as symmetrical or asymmetrical rotational parts, oscillating members, swinging members or members rotating at a more or less high speed, the invention will be described in connection with the balancing of balancing wheels for watches. Furthermore, the method according to the invention will be described in connection with the removal of material by drilling bores in the member to be balanced, but it is to be understood that the method according to the invention may equally well be practiced by adding material instead of removing material from the element to be balanced.

One of the objects of the present invention consists in the provision of an improved method which will make it possible to balance oscillating or rotating members at low cost.

It is another object of this invention to provide a balancing method according to which, when balancing a series of bodies, it will always be possible to follow the same sequence of steps involved according to the method of the invention.

It is still another object of this invention to provide a method for balancing small oscillating or rotating bodies, which can also be carried out automatically by machines.

A still further object of the present invention consists in the provision of a balancing method for oscillating or rotating bodies, which can be carried out by adding or removing material from the member to be balanced.

It is still another object of this invention to provide a method of balancing small oscillating or rotating bodies, in which the bodies for determining the portions where material has to be added or removed, will always assume a well defined position.

Still another object of this invention consists in the provision of a balancing method for small oscillating or rotating bodies, in which the portion from where material has to be removed or where material has to be added will always be located at a certain angle with regard to the natural line of gravity, said angle being independent of the magnitude of the natural unbalance.

These and other objects and advantages of the invention will appear more clearly from the following specification in connection with the accompanying drawings, in which.

General arrangement

The method according to the present invention is characterized primarily by carrying out the balancing of the natural unbalance, for instance of a balance wheel for a watch, by creating a first artificial unbalance at about a 90° angle with regard to the direction of the force of the natural unbalance, whereupon a second artificial unbalance is provided which has about the same torque as that of the first unbalance and which is located on the resultant from the first artificial unbalance and the natural unbalance.

In order in this connection to eliminate any possible remaining unbalance, according to the present invention, a third artificial unbalance is created at substantially 90° with regard to said second artificial unbalance, whereupon a fourth unbalance is provided which has the same torque as said third artificial unbalance, said fourth unbalance being arranged on the resultant from the remaining unbalance and the third artificial unbalance.

Structural arrangement

Figure 1:
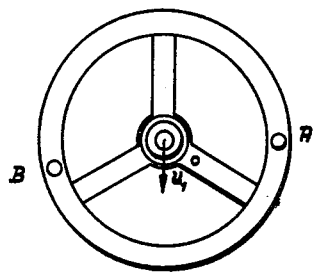
Fig. 1 illustrates a balance wheel as customary in the horological art provided with two balancing bores arranged in conformity with the present invention.
Figure 2:
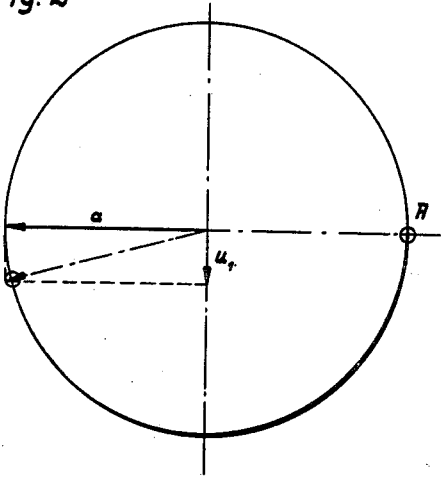
Fig. 2 represents a graph showing the forces for the balance wheel according to Fig. 1.

Referring now to the drawings in detail and Figs. 1 and 2 thereof in particular, the roughly balanced balance wheel shown in Fig. 1 contains an unbalanced $U_1$ indicated by a downwardly directed arrow. For balancing the wheel, there are provided two bores A and B of the same size, which two bores are equally spaced from the center of said balance wheel so that both bores bring about the same torque. The bore A is arranged substantially rectangularly with regard to the said natural unbalance $U_1$. The starting central point for the bore B, as described in detail in the following paragraph, is automatically obtained when allowing the balance wheel to assume its natural position. The angle of deflection of the bore B from the line passing through the bore A and the central axis of the balance wheel constitutes a measurement for the natural unbalance $U_1$, therefore making a separate determination for the natural unbalance unnecessary. In this way, also a gross error in the unbalance can immediately be discovered and the damaged part can immediately be discarded.

In Figs. 1 and 2 $U_1$ indicates an inherent natural unbalance which corresponds to the mean value of the inherent natural unbalance values of parts to be balanced in a group. The artificial unbalance produced by the bore A is to be selected of such a magnitude that the torque-weight $x$ radius value produced thereby will be four times the torque produced by the assumed mean natural unbalance value $U_1$. At the bore A there will then be produced a light point whereby an additional artificial unbalance is created having the magnitude and direction "$a$." By geometrically adding up the forces "$a$" and $U_1$, a resultant balance will be obtained which is directed toward the point B. If the balance wheel is caused to perform a further pendulum movement until it assumes a rest position, point B will occupy its lowest position in view of the said resultant unbalance. By providing a second bore at point B at the same distance from the center and of the same magnitude as at the point A, the resultant unbalance will be eliminated except for a remainder. The remaining unbalance is defined by the equation $U_R = \sqrt{a^2 + U_1^2} - a$. With the above assumed ratio of $a = 4 \times U_1$, a remaining unbalance of 12.3% of the original unbalance $U_1$ will be obtained.

Figure 3:
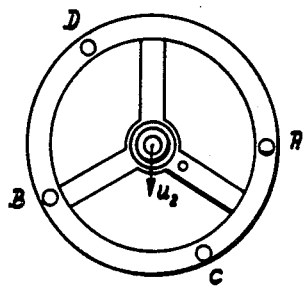
Fig. 3 is a balance wheel with four balancing bores arranged in conformity with the method of the present invention.
Figure 4:
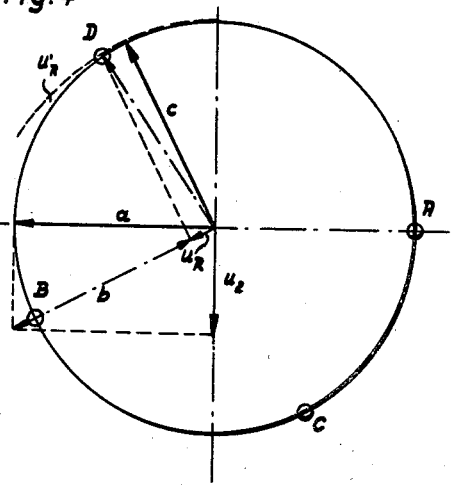
Fig. 4 is a graph showing the forces for the balance wheel of Fig. 3.

Figs. 1 and 2 and the above remarks are primarily intended to aid the understanding of the further steps of the new method as they will now be discussed in connection with Figs. 3 and 4. In Figs. 3 and 4, deliberately a somewhat distorted illustration has been shown, i.e., the natural unbalance has been increased to twice its mean value in order that the error in the remaining unbalance $U'_R$ will still be visible. As will be apparent from the following paragraph, the starting central point for the bore B is automatically obtained when allowing the balance wheel to assume its natural position. The method illustrated is intended for fine balancing which, however, is not necessary with slowly rotating gears, cam discs, etc., but which is of great importance in connection with the balance wheels of watches in order to avoid errors in the operation thereof.

Fig. 3 shows a balance wheel which is assumed to have a natural unbalance $U_2$ illustrated by a downwardly directed arrow. Approximately at a right angle to $U_2$, the balance wheel is provided with the first balancing bore A. From the balancing light spot and the natural unbalance $U_2$, there is obtained the location for a bore B which is to produce the same torque as the bore A, the location for said bore B being obtained in conformity with the method set forth above in connection with the description of Fig. 2. For purposes of carrying out the balancing in conformity with the present invention, a bore C is arranged substantially at 90° with regard to the remaining unbalance $U_R$. The bore C does not have to but may equal the bores A and B. Due to the remaining unbalance $U_R$ obtained by rough balancing and due to the artificial unbalance $c$ resulting from the provision of the bore C, the balancing wheel will, when allowed to assume its natural position, occupy a position in which the bore C will be located at the top portion of the balance wheel and, more specifically, will be close to the vertical passing through the center of the balance wheel. The distance of the bore C from the said vertical will serve as a measurement for the remaining unbalance which was obtained during the rough balancing operation. At the point of intersection of the said vertical and the spacing or torque circle of the bore C, a bore D is provided as shown in Fig. 3. The remaining balance now obtained, which for purpose of differentiating the same from the remaining unbalance $U_R$ of the rough balancing operation will be designated with the letters $U'_R$, is so small that with a natural unbalance of from zero to twice the mean natural unbalance, the remaining unbalance $U'_R$ will always be less than 3% of the mean natural unbalance.

The diagram shown in Fig. 4 does not appear to require any detailed discussion, inasmuch as the method involved is the same as that discussed in connection with Fig. 2 with the exception that the said method is employed twice. As has been mentioned above, the natural unbalance has deliberately been selected rather high in the drawing, namely, twice the mean natural unbalance, a value which is only very seldom obtained by the natural unbalance. The natural unbalance has been designated $U_2$. The artificial unbalance, as produced artificially by the bore A, together with $U_2$, yield a resultant which is intended for the point of bore B, which latter, in conformity with the conditions outlined, exerts the same torque as the bore A. Accordingly, the resultant acts counter to the force $b$. As remaining unbalance of the rough balancing operation, there will be obtained a remainder $U_R$ which, in conformity with the formula mentioned above $$U_R = \sqrt{a^2 + U_2^2} - b$$

will amount to 47.2% of the mean natural unbalance or to 23.6% of the actual unbalance $U_2$.

This remaining unbalance $U_R$ which is effective from the center of the balance wheel in the direction toward the bore B, is now geometrically added to a force $c$ which is substantially perpendicular to the remaining unbalance $U_R$ and is produced by the bore C, which latter, in the diagram of forces of Fig. 4, is shown to have the same torque as the bores A and B. The resultant of the forces $c$ and the remaining unbalance $U_R$ yield a resultant which at a relatively strong torque determines the point at which the bore D is produced with a torque equalling that of the bore C. According to the diagram, the torque of the bore D equals the torque of the bores A and B because also the torque of the bore C was elected to equal the torque of the bores A and B. The difference between the resultants and the force produced by the bore D yields the final remaining unbalance $U'_R$. For the sake of clarity, the course of the graph of the remaining unbalance error has been illustrated on the outside of the force circle.

The distance between this graph from the force circle illustrates the remaining error $U'_R$ within the range of a natural unbalance zero and about five times the mean natural unbalance. The graph has deliberately been indicated up to this exaggerated unbalance error in order to be able to show the minuteness of the error which results when the unbalance is within the range between half the mean natural unbalance and one and one-half of the mean natural unbalance.

This error can also be calculated by the following formula $$U'_R = \sqrt{(\sqrt{a^2 + U_2^2} - b)^2 + c^2} - d$$

in which $d$ indicates the force produced by the bore D. Since, as outlined above, it is assumed that $a=b$ and $c=d$ $$U'_R = \sqrt{(\sqrt{a^2 + U_2^2} - a)^2 + c^2} - c$$

$$= \sqrt{2a^2 + U_2^2 - 2a\sqrt{a^2 + U_2^2} + c^2} - c$$

Assuming, as in the diagram that $a=b=c=d$ $$U'_R = \sqrt{3a^2 - 2a\sqrt{a^2 + U_2^2} + U_2^2} - a$$

If for purposes of ascertaining the error in percent, $U_2$ is assumed to equal $U_1$, the said error will with regard to the natural prevailing unbalance at a ratio of $U_2 : a = 1 : 4$ be calculated as follows:

$$U'_R = \sqrt{3 \times 400^2 - 2 \times 400\sqrt{400^2 + 100^2} + 100^2} - 400$$

$$= \sqrt{160160} - 400 = 0, 0.189\%$$

If in the above calculation, a natural unbalance of twice the amount is assumed, a remaining unbalance of 2.8% will result.

The ratio between the mean natural unbalance and the artificial unbalance of the bores has at its lower limit the remaining unbalance error and at its upper limit certain precision requirements in the angular position, mechanical and human deficiencies. However, it has been proved that at a ratio $U : a = 1 : 4$ an optimum can be obtained.

The above calculations are based on a respective offsetting of the bore A with regard to the natural unbalance $U_2$ and on an offsetting of the bore C with regard to the remaining unbalance $U_R$ at an angle of 90°. As has been mentioned above, it may also be advantageous to employ an offsetting by a smaller angle as, for instance, 87°. An angle in excess of 90° is not advantageous, particularly with regard to the bore C.

Figure 5:
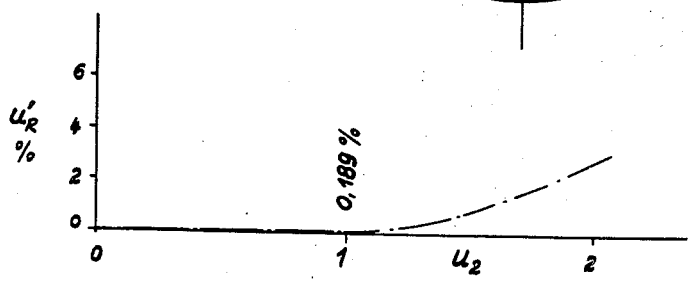
Fig. 5 represents a graph showing the remaining unbalance plotted over the mean natural unbalance.

The resulting remaining unbalance $U'_R$ is shown in percent in Fig. 5 with regard to the mean natural unbalance $U_2$. On the axis of said $U_2$ unbalance, 1 designates the mean value of the inherent natural unbalance, whereas 2 indicates double the starting point. From the graph of Fig. 5, it will be evident that the errors occurring with the method according to the present invention are so small that they are negligible with regard to the other errors obtained, for instance, by friction, subsequent mounting of the spring and the like. Furthermore, the method according to the invention is non-sensitive with regard to human deficiencies which above all produce the greatest error factor when balancing by hand. The method according to the invention can advantageously be carried out fully or partially automatically. While the method as described above merely deals with the balancing produced by removing material from the member to be balanced, it is, of course, understood that the method is in no way changed when effecting the balancing by adding material to the member to be balanced. Therefore, it appears to be superfluous to repeat the entire method by adding rather than removing material from the article to be balanced.

It is further to be understood that the present invention is, by no means, limited to the particular example shown in the drawings, but also comprises many modifications within the scope of the appended claims.

What I claim is:

A method of balancing balance wheels of watches, clocks and the like, which includes the steps of: freely rotatably supporting said balance wheel and allowing the same to swing about its axis of rotation so as to assume a position in which its natural center of gravity is located below said axis of rotation, creating a first artificial unbalance by removing material from said balance wheel at a point substantially perpendicular to the line passing through said axis of rotation and through said center of gravity, again allowing the balance wheel to swing about its axis of rotation so as to assume a new position in which its new center of gravity is located below said axis of rotation, providing a compensating unbalance by removing material from said balance wheel at a point located on the line passing through the axis of rotation and said new center of gravity and below said axis of rotation, employing said compensating unbalance as reference point for the repetition of the method by providing a second artificial unbalance by removing material from said balance wheel at a point substantially perpendicular to the line passing through the axis of rotation of said balance wheel and said compensating unbalance, again allowing said balance wheel to swing about its axis of rotation so as to assume a position in which its center of gravity changed by said last unbalance is located below said axis of rotation, and providing a further compensating unbalance along the thus resulting line of the center of gravity by removing the same amount of material from said balance wheel as was removed by the preceding provision of said second artificial unbalance.

References Cited in the file of this patent

UNITED STATES PATENTS

| | | |
|---|---|---|
| 2,288,690 | Eddison | July 7, 1942 |
| 2,554,033 | Kohlhagen | May 22, 1951 |
| 2,587,402 | Steel | Feb. 26, 1952 |
| 2,745,287 | Kohlhagen | May 15, 1956 |